United States Patent
Alion (10) Patent No.: US 11,801,881 B1
(45) Date of Patent: Oct. 31, 2023

(54) SUPPORT DOLLY FOR HITCHED-MOUNTED ACCESSORIES

(71) Applicant: Daniel Alion, Charlotte, NC (US)

(72) Inventor: Daniel Alion, Charlotte, NC (US)

( * ) Notice: Subject to any disclaimer, the term of this patent is extended or adjusted under 35 U.S.C. 154(b) by 43 days.

(21) Appl. No.: 17/689,016

(22) Filed: Mar. 8, 2022

(51) Int. Cl.
*B62B 3/04* (2006.01)
*B62B 3/02* (2006.01)

(52) U.S. Cl.
CPC . *B62B 3/04* (2013.01); *B62B 3/02* (2013.01)

(58) Field of Classification Search
CPC .................................. B62B 3/02; B62B 3/04
See application file for complete search history.

(56) References Cited

U.S. PATENT DOCUMENTS

| | | | | |
|---|---|---|---|---|
| 1,038,267 | A * | 9/1912 | Baylor | B62B 3/02 280/640 |
| 2,796,266 | A * | 6/1957 | Sells | B62B 3/02 280/789 |
| 3,888,442 | A * | 6/1975 | Comeaux | B65F 1/1415 248/188.7 |
| 5,257,892 | A * | 11/1993 | Branch | B62B 3/02 280/30 |
| 5,456,431 | A * | 10/1995 | Ilnisky | B65B 67/12 248/150 |
| 5,772,222 | A * | 6/1998 | Sim | B62B 3/02 280/30 |
| 6,419,245 | B1 * | 7/2002 | Trimble | B62B 3/10 175/162 |
| 8,006,996 | B1 * | 8/2011 | Johnston | B62B 3/008 280/79.5 |
| 8,231,035 | B1 | 7/2012 | Michael | |
| 9,387,739 | B2 | 7/2016 | Babuska | |
| 9,783,016 | B2 | 10/2017 | Forhan | |
| D881,078 | S * | 4/2020 | Rebick | B60D 1/58 D12/162 |
| 11,001,285 | B1 * | 5/2021 | Gayk | B62B 1/002 |
| 11,007,832 | B1 | 5/2021 | Rebick | |
| 2003/0127815 | A1 * | 7/2003 | Hall | B60B 33/0002 280/79.3 |
| 2004/0256819 | A1 * | 12/2004 | Sorensen | B25H 1/0007 280/79.11 |
| 2006/0091096 | A1 * | 5/2006 | Velez | B62B 3/102 211/60.1 |

(Continued)

*Primary Examiner* — Erez Gurari
(74) *Attorney, Agent, or Firm* — Kyle A. Fletcher, Esq.

(57) ABSTRACT

The support dolly for hitch-mounted accessories includes a center plate, a plurality of outrigger tubes, a plurality of wheel assemblies, a right angle adapter, and a plurality of lock pins. The support dolly for hitch-mounted accessories may be operable as a stationary stand for storing a hitch-mounted accessory when the plurality of wheel assemblies are not deployed or as a dolly for moving the hitch-mounted accessory when the plurality of wheel assemblies are deployed. As non-limiting examples, the hitch-mounted accessory may be an accessory that couples to a trailer hitch receiver tube of a tow vehicle such as a bike rack, a winch, a generator, a cargo basket, or a dirt bike carrier. The support dolly for hitch-mounted accessories may be reconfigurable to alter the footprint of the support dolly for hitch-mounted accessories or to couple multiples of the center plates together.

16 Claims, 7 Drawing Sheets

(56) References Cited

U.S. PATENT DOCUMENTS

| | | | | |
|---|---|---|---|---|
| 2008/0048161 | A1* | 2/2008 | Meyer | B66F 3/12 |
| | | | | 254/2 R |
| 2008/0308692 | A1* | 12/2008 | Cheng | F16M 11/40 |
| | | | | 248/188.8 |
| 2010/0314899 | A1 | 12/2010 | Slacks | |
| 2011/0057403 | A1* | 3/2011 | Nunnikhoven | B62B 1/262 |
| | | | | 280/47.35 |
| 2015/0028568 | A1* | 1/2015 | Tran | A63B 55/57 |
| | | | | 280/641 |
| 2017/0088155 | A1* | 3/2017 | Silva | B62B 3/12 |
| 2017/0361813 | A1 | 12/2017 | Anderson | |
| 2020/0189316 | A1* | 6/2020 | Sauer | B62B 3/104 |
| 2020/0317243 | A1* | 10/2020 | Leroux-Gamelin | B62B 5/082 |
| 2023/0099470 | A1* | 3/2023 | Marchal | F17C 13/08 |
| | | | | 414/800 |

* cited by examiner

SUPPORT DOLLY FOR HITCHED-MOUNTED ACCESSORIES

BACKGROUND OF THE INVENTION

Field of the Invention

The present invention relates to the fields of storage stands and dollies, more specifically, a support dolly for hitch-mounted accessories.

SUMMARY OF INVENTION

The support dolly for hitch-mounted accessories comprises a center plate, a plurality of outrigger tubes, a plurality of wheel assemblies, a right angle adapter, and a plurality of lock pins. The support dolly for hitch-mounted accessories may be operable as a stationary stand for storing a hitch-mounted accessory when the plurality of wheel assemblies are not deployed. As non-limiting examples, the hitch-mounted accessory may be an accessory that couples to a trailer hitch receiver tube of a tow vehicle such as a bike rack, a winch, a generator, a cargo basket, or a dirt bike carrier. The support dolly for hitch-mounted accessories may additionally be operable as a dolly for moving the hitch-mounted accessory when the plurality of wheel assemblies are deployed. The support dolly for hitch-mounted accessories may be reconfigurable to alter the footprint of the support dolly for hitch-mounted accessories or to couple multiples of the center plates together.

An object of the invention is to store a hitch-mounted accessory on a stationary stand.

Another object of the invention is to move a hitch-mounted accessory on a wheeled dolly.

A further object of the invention is to provide a center plate, a plurality of outrigger tubes, a plurality of wheel assemblies, and a plurality of lock pins that enable the invention to be reconfigurable to change the foot print and to couple multiple center plates into larger configurations.

Yet another object of the invention is to provide wheel assemblies that may be inverted to place either a castor wheel or a standoff in contact with the floor.

These together with additional objects, features and advantages of the support dolly for hitch-mounted accessories will be readily apparent to those of ordinary skill in the art upon reading the following detailed description of the presently preferred, but nonetheless illustrative, embodiments when taken in conjunction with the accompanying drawings.

In this respect, before explaining the current embodiments of the support dolly for hitch-mounted accessories in detail, it is to be understood that the support dolly for hitch-mounted accessories is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the support dolly for hitch-mounted accessories.

It is therefore important that the claims be regarded as including such equivalent construction insofar as they do not depart from the spirit and scope of the support dolly for hitch-mounted accessories. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The support dolly for hitch-mounted accessories 100 (hereinafter invention) comprises a center plate 200, a plurality of outrigger tubes 240, a plurality of wheel assemblies 250, and a plurality of lock pins 260. The invention 100 may be operable as a stationary stand for storing a hitch-mounted accessory 920 when the plurality of wheel assemblies 250 are not deployed. As non-limiting examples, the hitch-mounted accessory 920 may be an accessory that couples to a trailer hitch receiver tube of a tow vehicle such as a bike rack, a winch, a generator, a cargo basket, or a dirt bike carrier. The invention 100 may additionally be operable as a dolly for moving the hitch-mounted accessory 920 when the plurality of wheel assemblies 250 are deployed. The invention 100 may be reconfigurable to alter the footprint of the invention 100 or to couple multiples of the center plates 200 together.

The center plate 200 may be a circular metal plate. The center plate 200 may be a supporting base for the invention 100. The center plate 200 may comprise a vertical receiver tube 204 and a plurality of outrigger ports.

The vertical receiver tube 204 may be a vertically-oriented square metal tube coupled to the top surface of the center plate 200. The vertical receiver tube 204 may be hollow and open ended on the top. The vertical receiver tube 204 may be offset from the center of the center plate 200. The inside diameter of the vertical receiver tube 204 may match the inside diameter of the trailer hitch receiver tube of the tow vehicle such that the hitch-mounted accessory 920 may be removably coupled to the vertical receiver tube 204. The vertical receiver tube 204 may comprise one or more pairs of vertical receiver apertures 206 for coupling the hitch-mounted accessory 920 to the vertical receiver tube 204.

The plurality of outrigger ports may be operable to removably couple the plurality of outrigger tubes 240 to the center plate 200. The plurality of outrigger ports may be horizontally oriented and coupled to the top surface of the center plate 200. The plurality of outrigger ports may comprise two groups based upon size and orientation. The plurality of outrigger ports may comprise a plurality of short outrigger ports 210 and a plurality of long outrigger ports 220.

The plurality of short outrigger ports 210 may be operable to removably couple the plurality of outrigger tubes 240 to the center plate 200 such that the plurality of outrigger tubes 240 are aligned radially with respect to the center of the center plate 200. Each of the plurality of short outrigger ports 210 may be operable to couple one of the plurality of outrigger tubes 240 to the center plate 200. The plurality of short outrigger ports 210 may be oriented perpendicular to each other. The plurality of short outrigger ports 210 may be evenly spaced around the center of the center plate 200. The plurality of short outrigger ports 210 may be located at a midpoint between the center and the outside edge 202 of the center plate 200. An individual short outrigger port selected from the plurality of short outrigger ports 210 may comprise a pair of short outrigger port apertures 212. The pair of short outrigger port apertures 212 may be located at the center of the sides of the individual short outrigger port. The pair of short outrigger port apertures 212 may align such that the plurality of lock pins 260 may pass through the individual short outrigger port.

The plurality of long outrigger ports 220 may be operable to removably couple the plurality of outrigger tubes 240 to the center plate 200 such that the plurality of outrigger tubes 240 form a right angle with respect to a radial passing through the center of the center plate 200. Each of the plurality of long outrigger ports 220 may be operable to couple one or two of the plurality of outrigger tubes 240 to the center plate 200. The plurality of long outrigger ports 220 may be oriented perpendicular to each other. The plurality of long outrigger ports 220 may be evenly spaced around the center of the center plate 200. The plurality of long outrigger ports 220 may be located adjacent to the outside edge 202 of the center plate 200. An individual long outrigger port selected from the plurality of long outrigger ports 220 may comprise a first pair of long outrigger port apertures 222 and a second pair of long outrigger port apertures 224. The first pair of long outrigger port apertures 222 and the second pair of long outrigger port apertures 224 may be located on the sides and at opposing ends of the individual long outrigger port. The first pair of long outrigger port apertures 222 may align such that the plurality of lock pins 260 may pass through the individual long outrigger port at the first pair of long outrigger port apertures 222. The second pair of long outrigger port apertures 224 may align such that the plurality of lock pins 260 may pass through the individual long outrigger port at the second pair of long outrigger port apertures 224. The vertical receiver tube 204 may be aligned such that the sides of the vertical receiver tube 204 are parallel to the orientation of the plurality of long outrigger ports 220.

The length of the plurality of long outrigger ports 220 may be longer than the length of the plurality of short outrigger ports 210 such that the plurality of long outrigger ports 220 may couple to two of the plurality of outrigger tubes 240.

The plurality of short outrigger ports 210 and the plurality of long outrigger ports 220 may be arranged such that none of the plurality of short outrigger ports 210 interfere with the plurality of outrigger tubes 240 coupled to any of the plurality of long outrigger ports 220 and such that none of the plurality of long outrigger ports 220 interfere with the plurality of outrigger tubes 240 coupled to any of the plurality of short outrigger ports 210.

The plurality of outrigger tubes 240 may be open-ended square hollow metal tubes that may couple to the plurality of outrigger ports and may extend horizontally beyond the outside edge 202 of the center plate 200. The outside diameter of the plurality of outrigger tubes 240 may be less than the inside diameter of the plurality of outrigger ports such that the plurality of outrigger tubes 240 may slide into the plurality of outrigger ports. An individual outrigger tube selected from the plurality of outrigger tubes 240 may comprise a first pair of outrigger apertures 242 and a second pair of outrigger apertures 244. The first pair of outrigger apertures 242 and the second pair of outrigger apertures 244 may be located on the sides of the individual outrigger tube and at opposing ends of the individual outrigger tube. The first pair of outrigger apertures 242 may align such that the plurality of lock pins 260 may pass through the individual outrigger tube at the first pair of outrigger apertures 242. The second pair of outrigger apertures 244 may align such that the plurality of lock pins 260 may pass through the individual outrigger tube at the second pair of outrigger apertures 244.

The plurality of outrigger tubes 240 may removably couple the plurality of outrigger ports to the plurality of wheel assemblies 250. Alternatively, one of the plurality of outrigger ports on a first center plate may couple to one of the plurality of outrigger ports on a second center plate.

The plurality of wheel assemblies 250 may removably couple to the plurality of outrigger tubes 240. An individual wheel assembly selected from the plurality of wheel assemblies 250 may comprise a wheel tube 252, a castor wheel 256, and a standoff 258. The wheel tube 252 may be an open-ended square metal tube comprising a hollow center. The inside diameter of the wheel tube 252 may be larger than the outside diameter of the plurality of outrigger tubes 240 such that the wheel tube 252 may slide over the plurality of outrigger tubes 240. The castor wheel 256 may be coupled to one side of the wheel tube 252. The standoff 258 may be coupled to the side of the wheel tube 252 that is opposite the castor wheel 256. The wheel tube 252 may comprise a pair of wheel assembly apertures 254 that pass through the centers of the two sides of the wheel tube 252 that do not comprise the castor wheel 256 and the standoff 258.

The individual wheel assembly may be deployed by sliding the individual wheel assembly onto one of the plurality of outrigger tubes 240 with the castor wheel 256 down such that the castor wheel 256 may contact the floor and roll. The individual wheel assembly may be removed from deployment by inverting the individual wheel assembly such that the castor wheel 256 is up and the standoff 258 is down. The thickness of the standoff 258 may match the thickness of the center plate 200 such that when the castor wheel 256 is not deployed the standoff 258 may contact the floor.

The center plate 200 may comprise a plurality of wheel storage apertures 230. The plurality of wheel storage apertures 230 may pass vertically through the center plate 200 and may be operable to retain the plurality of wheel assemblies 250 when the plurality of wheel assemblies 250 are placed on top of the center plate 200 with the standoffs 258 of the plurality of wheel assemblies 250 inserted into the plurality of wheel storage apertures 230. There may be one of the plurality of wheel storage apertures 230 for each of the plurality of wheel assemblies 250. The standoff 258 may be round such that the plurality of wheel assemblies 250 may be stored on the center plate 200 by placing the standoffs 258 into the plurality of wheel storage apertures 230 when the plurality of wheel assemblies 250 are not in use. The plurality of wheel storage apertures 230 may be used to bolt the invention 100 to a stationary object, which may or may not be when the invention 100 is in use.

The plurality of lock pins 260 may be operable to couple combinations of the plurality of outrigger ports, the plurality of outrigger tubes 240, and the plurality of wheel assemblies 250. As non-limiting examples, the plurality of lock pins 260 may couple the individual short outrigger ports to the individual outrigger tubes, the individual long outrigger ports to the individual outrigger tubes, and the individual wheel assemblies to the individual outrigger tubes.

An individual lock pin selected from the plurality of lock pins 260 may comprise a hitch pin 262, a cotter hairpin 270, and a lanyard 272. The hitch pin 262 may be a straight metal pin that may slide through paired apertures to prevent a component from sliding off of the individual outrigger tube. As non-limiting examples, the hitch pin 262 may slide through the pair of short outrigger port apertures 212 and the second pair of outrigger apertures 244 to retain the individual outrigger tube within the individual short outrigger port, through the first pair of long outrigger port apertures 222 and the second pair of outrigger apertures 244 to retain the individual outrigger tube within the individual long outrigger port, or through the pair of wheel assembly apertures 254 and the second pair of outrigger apertures 242 to retain the individual wheel assembly on the individual outrigger tube. The hitch pin 262 may comprise a hitch pin aperture 266 that passes laterally through the tip of the hitch pin 262. The cotter hairpin 270 may pass through the hitch pin 262. The hitch pin 262 may comprise a hitch pin stop 264 on the end of the hitch pin 262 that is opposite the hitch pin aperture 266. The hitch pin stop 264 and the cotter hairpin 270 may limit movement of the hitch pin 262 and thereby hold the individual lock pin in place. The lanyard 272 may couple the cotter hairpin 270 to the hitch pin 262 to prevent loss of the cotter hairpin 270.

In some embodiments, the hitch pin 262 may comprise a hitch pin handle 268 that may be adapted for a user to grasp when inserting and removing the individual lock pin. In some embodiments, the plurality of lock pins 260 may involve different styles of lock pins, which are interchangeable.

In some embodiments, a right angle adapter 280 may be operable to change the angle between a drawbar 930 of the hitch-mounted accessory 920 and the vertical receiver tube 204. The right angle adapter 280 may comprise a vertical adapter tube 282 and a horizontal adapter tube 286. The vertical adapter tube 282 may be a vertically oriented square metal tube. The horizontal adapter tube 286 may be a horizontally oriented square metal tube. The top of the vertical adapter tube 282 may be coupled to the horizontal adapter tube 286. The outside diameter of the vertical adapter tube 282 may be smaller than the inside diameter of the vertical receiver tube 204 such that the vertical adapter tube 282 may slide into the vertical receiver tube 204. The inside diameter of the horizontal adapter tube 286 may be larger than the outside diameter of the drawbar 930 of the hitch-mounted accessory 920 such that the drawbar 930 may slide into the horizontal adapter tube 286. The right angle adapter 280 may be used by inserting the bottom of the vertical adapter tube 282 into the vertical receiver tube 204 and then inserting the drawbar 930 of the hitch-mounted accessory 920 into the horizontal adapter tube 286.

In some embodiments, the vertical adapter tube 282 may comprise a pair of vertical adapter tube apertures 284 for securing the right angle adapter 280 to the vertical receiver tube 204.

Figure 1:
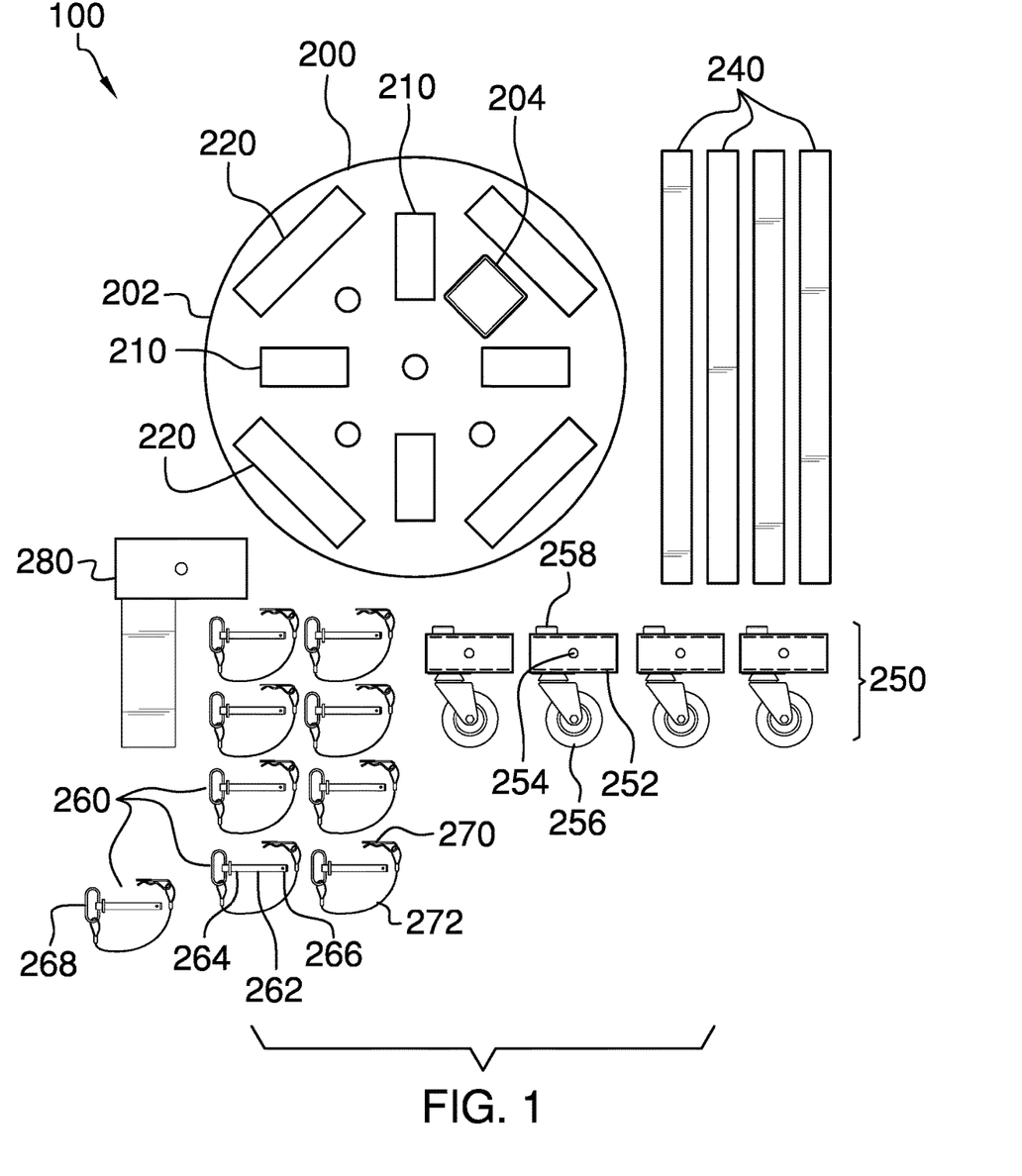
FIG. 1 is a top kit view of an embodiment of the disclosure.
Figure 2:
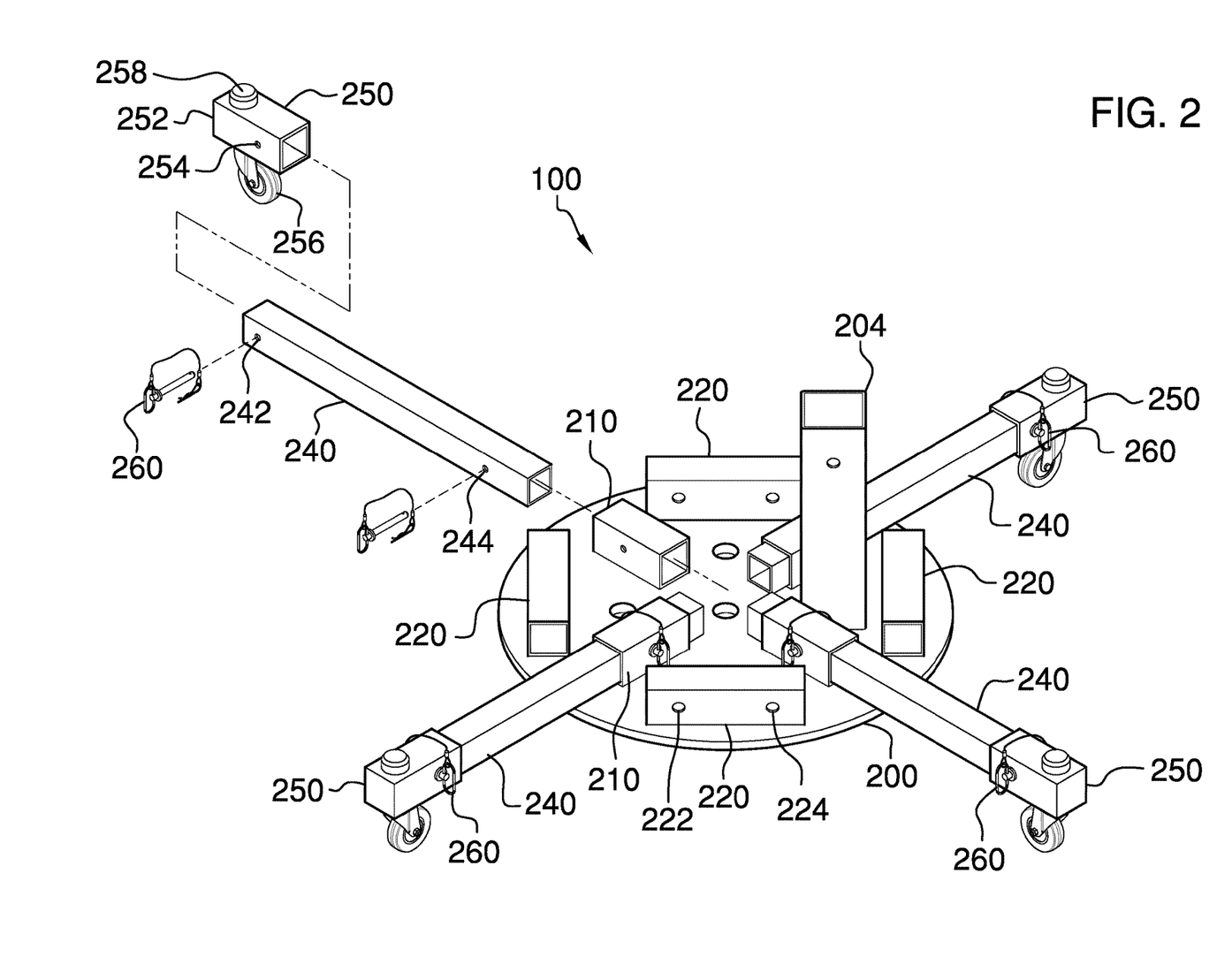
FIG. 2 is an isometric view of an embodiment of the disclosure illustrating the outrigger tubes coupled to the short outrigger ports.
Figure 3:
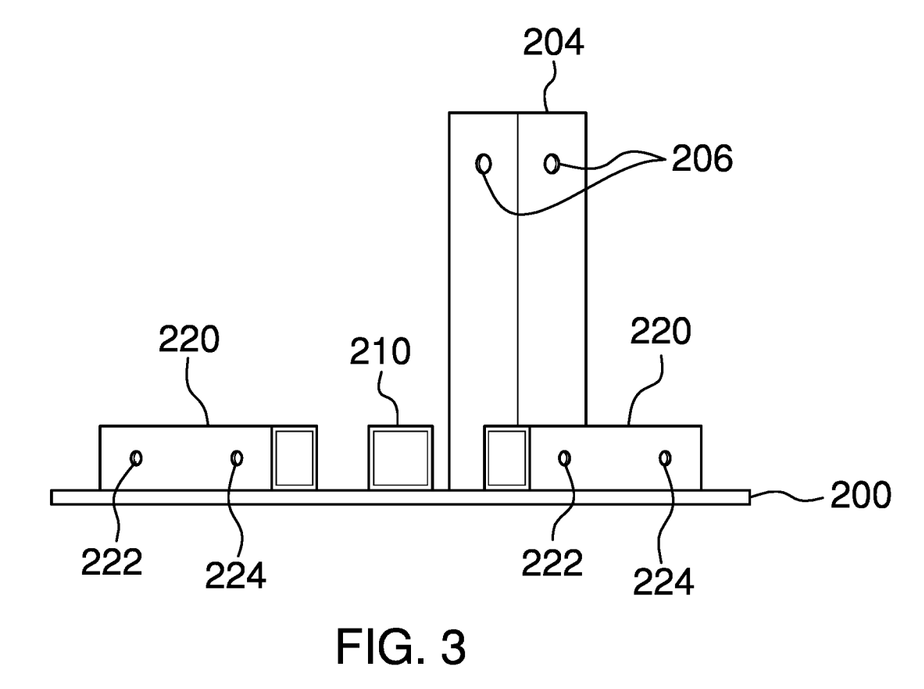
FIG. 3 is a front view of an embodiment of the disclosure.
Figure 4:
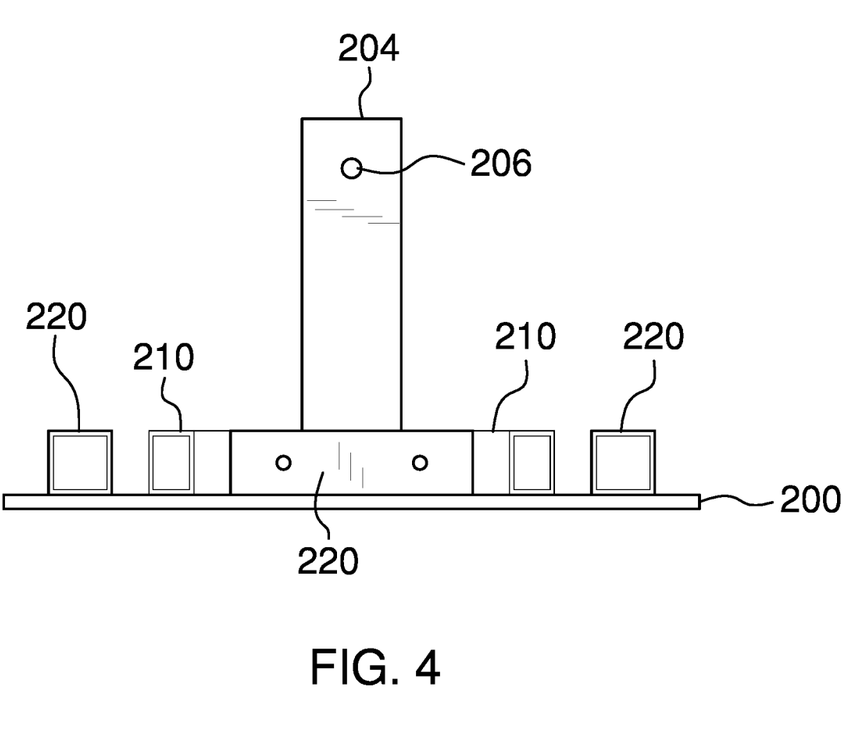
FIG. 4 is a side view of an embodiment of the disclosure.
Figure 5:
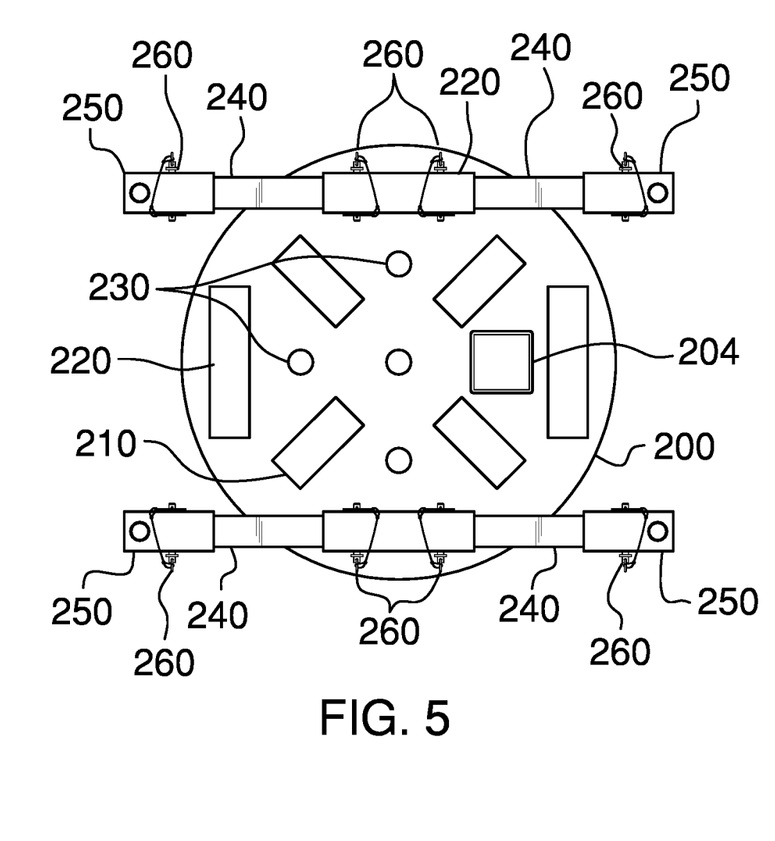
FIG. 5 is a top view of an embodiment of the disclosure illustrating the outrigger tubes coupled to the long outrigger ports.

In use, the drawbar 930 of a hitch-mounted accessory 920 may be inserted into the vertical receiver tube 204 to store the hitch-mounted accessory 920 while the hitch-mounted accessory 920 is not in use. A plurality of outrigger tubes 240 and a plurality of wheel assemblies 250 may be coupled to the center plate 200 to enlarge the footprint of the invention 100 when the hitch-mounted accessory 920 is large enough and/or heavy enough to create safety concerns. A number of different configurations are possible. As a non-limiting example, the plurality of outrigger tubes 240 may be coupled to the plurality of short outrigger ports 210 to orient the plurality of outrigger tubes 240 radially away from the center of the center plate 200 as shown in FIG. 2. As an alternative non-limiting example, two of the plurality of outrigger tubes 240 may be coupled to the same long outrigger port and two different outrigger tubes may be coupled to the long outrigger port on the opposite side as shown in FIG. 5. The plurality of wheel assemblies 250 may be coupled to the distal ends of the plurality of outrigger tubes 240 with the standoffs 258 down to use the invention 100 as a stationary stand or with the castor wheels 256 down to use the invention 100 as a dolly.

Figure 6:
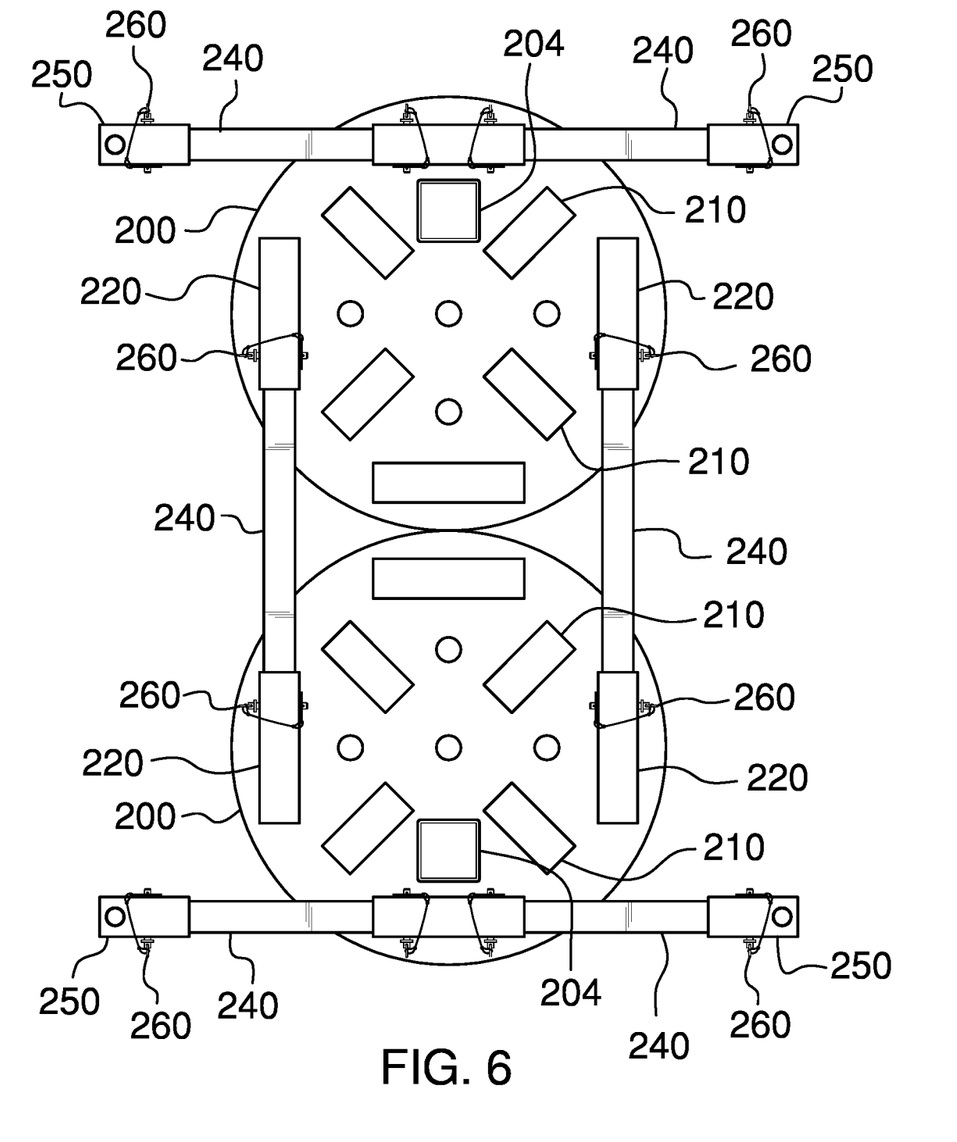
FIG. 6 is a top view of an embodiment of the disclosure illustrating two center plates coupled to each other using outrigger tubes.
Figure 7:
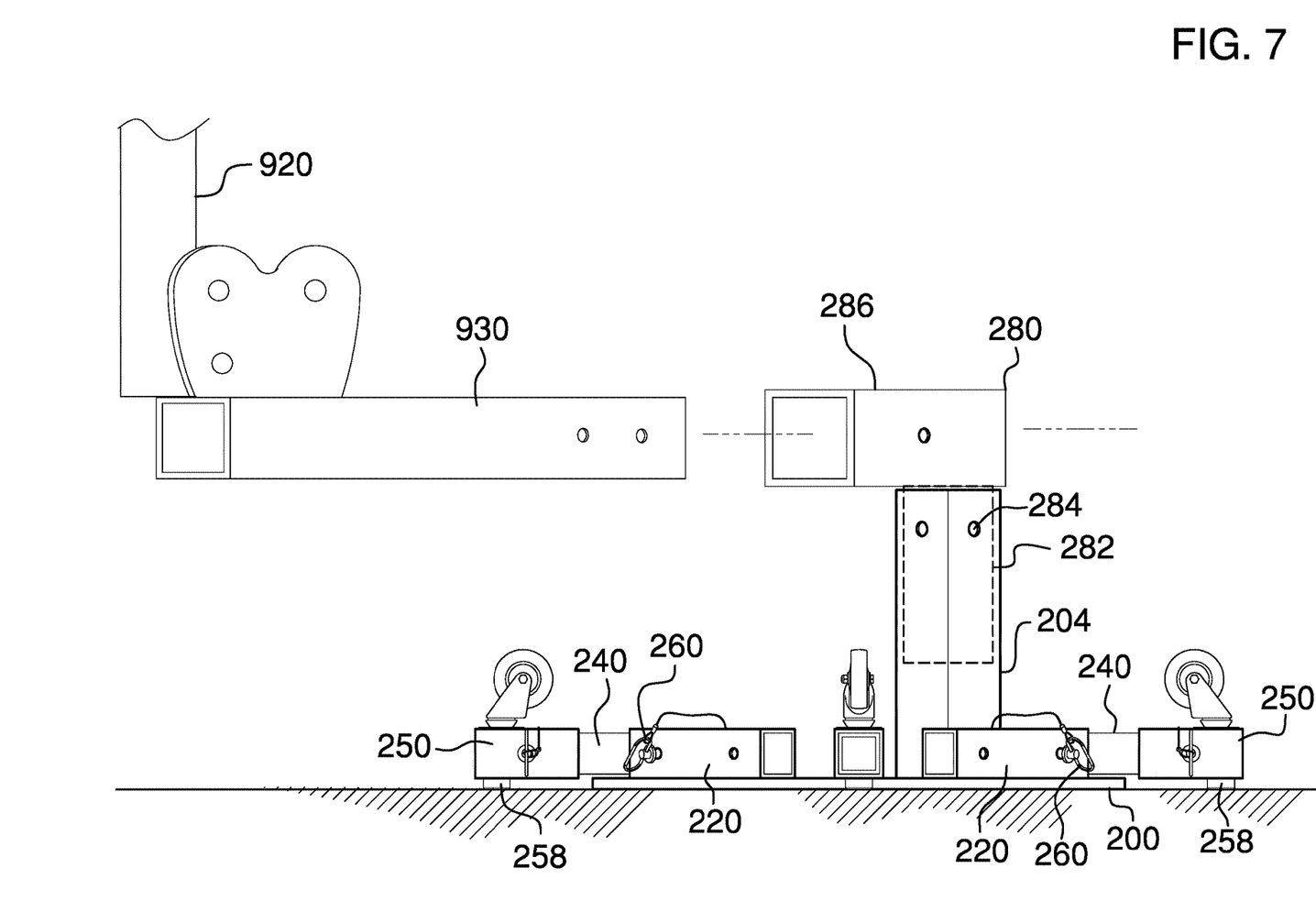
FIG. 7 is an in-use view of an embodiment of the disclosure.

Two or more of the center plates 200 may be coupled together to handle multiple hitch-mounted accessories or larger hitch-mounted accessories. As a non-limiting example, the center plates 200 may be coupled to form an H configuration as shown in FIG. 6 by coupling two of the plurality of outrigger tubes 240 between the center plates 200 and then coupling four of the plurality of outrigger tubes 240—two to each of the center plates 200—to enlarge the footprint.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "accessory" may be a second object that adds to the convenience or attractiveness of a first object. In some instances, an accessory may extend the functionality of the first object by allowing the combination of the accessory plus the first object to perform a task that the first object could not perform alone.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be where an operator or user of the object makes contact with the object. In some instances, the point of origin or point of reference may be a center point, a central axis, or a centerline of an object and the direction of comparison may be in a radial or lateral direction.

As used in this disclosure, a "dolly" may refer to a mobile platform, generally mounted on one or more rollers, wheels, or casters, that is used to move a load or an object.

As used here, "footprint" may refer to a projection of an object onto the surface that supports the object. The projection is usually, but not always, vertically downward.

As used herein, a "hitch receiver" may be the portion of a trailer hitch which is permanently mounted to a vehicle and which presents a rectangular open tube at the rear center of the vehicle into which a ball hitch or cargo accessory may be coupled.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object. Specifically, the inside diameter is the distance from one inside wall to the opposite inside wall.

As used in this disclosure, the word "lateral" may refer to the sides of an object or movement towards a side. Lateral directions are generally perpendicular to longitudinal directions. "Laterally" may refer to movement in a lateral direction.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead may be separated from the exact midpoint by up to 50% of the distance from the exact midpoint to the farthest edge, farthest end, or farthest corner.

As used in this disclosure, "orientation" may refer to the positioning and/or angular alignment of a first object relative to a second object or relative to a reference position or reference direction.

As used herein, "outside diameter" or "outer diameter" may refer to a measurement made on an object. Specifically, the outside diameter is the distance from one point on the outside of the object to a point on the opposite side of the object along a line passing through the center of the object.

As used in this disclosure, an "outrigger" may be a beam, frame or other first structure that is attached to, but extends beyond the defined boundaries of a second structure.

As used in this disclosure, the term "radial" may refer to a direction which is perpendicular to an identified central axis or which projects away from a center point.

As used in this disclosure, a "trailer" may be an unpowered wheeled vehicle that is towed by a powered vehicle.

As used in this disclosure, a "tube" or "tubing" may refer to a hollow cylindrical device that is used for transporting liquids and/or gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline they are said to be aligned. When the centerlines of two tubes are perpendicular to each other, the tubes are said to be perpendicular to each other. As used here, "tubing" may refer to a tube that is flexible or resilient.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A support dolly for hitch-mounted accessories comprising:
   a center plate, a plurality of outrigger tubes, a plurality of wheel assemblies, and a plurality of lock pins;
   wherein the support dolly for hitch-mounted accessories is operable as a stationary stand for storing a hitch-mounted accessory when the plurality of wheel assemblies are not deployed;
   wherein the support dolly for hitch-mounted accessories is operable as a dolly for moving the hitch-mounted accessory when the plurality of wheel assemblies are deployed;

wherein the support dolly for hitch-mounted accessories is reconfigurable to alter the footprint of the support dolly for hitch-mounted accessories or to couple multiples of the center plates together;

wherein the center plate is a circular metal plate;

wherein the center plate is a supporting base for the support dolly for hitch-mounted accessories;

wherein the center plate comprises a vertical receiver tube and a plurality of outrigger ports.

2. The support dolly for hitch-mounted accessories according to claim 1 wherein the vertical receiver tube is a vertically-oriented square metal tube coupled to the top surface of the center plate;

wherein the vertical receiver tube is hollow and open ended on the top;

wherein the vertical receiver tube is offset from the center of the center plate;

wherein the inside diameter of the vertical receiver tube matches the inside diameter of a trailer hitch receiver tube of a tow vehicle such that the hitch-mounted accessory removably coupled to the vertical receiver tube;

wherein the vertical receiver tube comprises one or more pairs of vertical receiver apertures for coupling the hitch-mounted accessory to the vertical receiver tube.

3. The support dolly for hitch-mounted accessories according to claim 2 wherein the plurality of outrigger ports are operable to removably couple the plurality of outrigger tubes to the center plate;

wherein the plurality of outrigger ports are horizontally oriented and coupled to the top surface of the center plate;

wherein the plurality of outrigger ports comprise two groups based upon size and orientation;

wherein the plurality of outrigger ports comprise a plurality of short outrigger ports and a plurality of long outrigger ports.

4. The support dolly for hitch-mounted accessories according to claim 3 wherein the plurality of short outrigger ports are operable to removably couple the plurality of outrigger tubes to the center plate such that the plurality of outrigger tubes are aligned radially with respect to the center of the center plate;

wherein each of the plurality of short outrigger ports are operable to couple one of the plurality of outrigger tubes to the center plate;

wherein the plurality of short outrigger ports are oriented perpendicular to each other;

wherein the plurality of short outrigger ports are evenly spaced around the center of the center plate;

wherein the plurality of short outrigger ports are located at a midpoint between the center and the outside edge of the center plate;

wherein an individual short outrigger port selected from the plurality of short outrigger ports comprises a pair of short outrigger port apertures;

wherein the pair of short outrigger port apertures are located at the center of the sides of the individual short outrigger port;

wherein the pair of short outrigger port apertures align such that the plurality of lock pins pass through the individual short outrigger port.

5. The support dolly for hitch-mounted accessories according to claim 4 wherein the plurality of long outrigger ports are operable to removably couple the plurality of outrigger tubes to the center plate such that the plurality of outrigger tubes form a right angle with respect to a radial passing through the center of the center plate;

wherein each of the plurality of long outrigger ports are operable to couple one or two of the plurality of outrigger tubes to the center plate;

wherein the plurality of long outrigger ports are oriented perpendicular to each other;

wherein the plurality of long outrigger ports are evenly spaced around the center of the center plate;

wherein the plurality of long outrigger ports are located adjacent to the outside edge of the center plate;

wherein an individual long outrigger port selected from the plurality of long outrigger ports comprises a first pair of long outrigger port apertures and a second pair of long outrigger port apertures;

wherein the first pair of long outrigger port apertures and the second pair of long outrigger port apertures are located on the sides and at opposing ends of the individual long outrigger port;

wherein the first pair of long outrigger port apertures align such that the plurality of lock pins pass through the individual long outrigger port at the first pair of long outrigger port apertures;

wherein the second pair of long outrigger port apertures align such that the plurality of lock pins pass through the individual long outrigger port at the second pair of long outrigger port apertures;

wherein the vertical receiver tube is aligned such that the sides of the vertical receiver tube are parallel to the orientation of the plurality of long outrigger ports.

6. The support dolly for hitch-mounted accessories according to claim 5 wherein the length of the plurality of long outrigger ports is longer than the length of the plurality of short outrigger ports such that the plurality of long outrigger ports are operable to couple to two of the plurality of outrigger tubes.

7. The support dolly for hitch-mounted accessories according to claim 6 wherein the plurality of short outrigger ports and the plurality of long outrigger ports are arranged such that none of the plurality of short outrigger ports interfere with the plurality of outrigger tubes coupled to any of the plurality of long outrigger ports and such that none of the plurality of long outrigger ports interfere with the plurality of outrigger tubes coupled to any of the plurality of short outrigger ports.

8. The support dolly for hitch-mounted accessories according to claim 7 wherein the plurality of outrigger tubes are open-ended square hollow metal tubes that couple to the plurality of outrigger ports and extend horizontally beyond the outside edge of the center plate;

wherein the outside diameter of the plurality of outrigger tubes are less than the inside diameter of the plurality of outrigger ports such that the plurality of outrigger tubes slide into the plurality of outrigger ports;

wherein an individual outrigger tube selected from the plurality of outrigger tubes comprises a first pair of outrigger apertures and a second pair of outrigger apertures;

wherein the first pair of outrigger apertures and the second pair of outrigger apertures are located on the sides of the individual outrigger tube and at opposing ends of the individual outrigger tube;

wherein the first pair of outrigger apertures align such that the plurality of lock pins pass through the individual outrigger tube at the first pair of outrigger apertures;

wherein the second pair of outrigger apertures align such that the plurality of lock pins pass through the individual outrigger tube at the second pair of outrigger apertures.

9. The support dolly for hitch-mounted accessories according to claim 8
wherein one of the plurality of outrigger ports on a first center plate couples to one of the plurality of outrigger ports on a second center plate.

10. The support dolly for hitch-mounted accessories according to claim 8
wherein the plurality of outrigger tubes removably couple the plurality of outrigger ports to the plurality of wheel assemblies.

11. The support dolly for hitch-mounted accessories according to claim 10
wherein an individual wheel assembly selected from the plurality of wheel assemblies comprises a wheel tube, a castor wheel, and a standoff;
wherein the wheel tube is an open-ended square metal tube comprising a hollow center;
wherein the inside diameter of the wheel tube is larger than the outside diameter of the plurality of outrigger tubes such that the wheel tube slides over the plurality of outrigger tubes;
wherein the castor wheel is coupled to one side of the wheel tube;
wherein the standoff is coupled to the side of the wheel tube that is opposite the castor wheel;
wherein the wheel tube comprises a pair of wheel assembly apertures that pass through the centers of the two sides of the wheel tube that do not comprise the castor wheel and the standoff.

12. The support dolly for hitch-mounted accessories according to claim 11
wherein the individual wheel assembly is deployed by sliding the individual wheel assembly onto one of the plurality of outrigger tubes with the castor wheel down such that the castor wheel contacts the floor and roll;
wherein the individual wheel assembly is removed from deployment by inverting the individual wheel assembly such that the castor wheel is up and the standoff is down;
wherein the thickness of the standoff matches the thickness of the center plate such that when the castor wheel is not deployed the standoff contacts the floor.

13. The support dolly for hitch-mounted accessories according to claim 12
wherein the plurality of lock pins are operable to couple combinations of the plurality of outrigger ports, the plurality of outrigger tubes, and the plurality of wheel assemblies.

14. The support dolly for hitch-mounted accessories according to claim 13
wherein the plurality of lock pins couple the individual short outrigger ports to the individual outrigger tubes, the individual long outrigger ports to the individual outrigger tubes, and the individual wheel assemblies to the individual outrigger tubes.

15. The support dolly for hitch-mounted accessories according to claim 14
wherein a right angle adapter is operable to change the angle between a drawbar of the hitch-mounted accessory and the vertical receiver tube;
wherein the right angle adapter comprises a vertical adapter tube and a horizontal adapter tube;
wherein the vertical adapter tube is a vertically oriented square metal tube;
wherein the horizontal adapter tube is a horizontally oriented square metal tube;
wherein the top of the vertical adapter tube is coupled to the horizontal adapter tube;
wherein the outside diameter of the vertical adapter tube is smaller than the inside diameter of the vertical receiver tube such that the vertical adapter tube slides into the vertical receiver tube;
wherein the inside diameter of the horizontal adapter tube is larger than the outside diameter of the drawbar of the hitch-mounted accessory such that the drawbar slides into the horizontal adapter tube;
wherein the right angle adapter is used by inserting the bottom of the vertical adapter tube into the vertical receiver tube and then inserting the drawbar of the hitch-mounted accessory into the horizontal adapter tube.

16. The support dolly for hitch-mounted accessories according to claim 15 wherein the vertical adapter tube comprises a pair of vertical adapter tube apertures for securing the right angle adapter to the vertical receiver tube.

* * * * *